United States Patent
Lee et al.

(10) Patent No.: US 12,099,211 B2
(45) Date of Patent: Sep. 24, 2024

(54) MICROLENS ARRAY HAVING RANDOM PATTERNS AND METHOD FOR MANUFACTURING SAME

(71) Applicant: Namuga Co., Ltd., Gyeonggi-do (KR)

(72) Inventors: Jun Youb Lee, Gyeonggi-do (KR); Young Gyu Kang, Gyeonggi-do (KR); Jeong Hwa Seo, Gyeonggi-do (KR)

(73) Assignee: Namuga Co., Ltd., Gyeonggi-do (KR)

( * ) Notice: Subject to any disclaimer, the term of this patent is extended or adjusted under 35 U.S.C. 154(b) by 556 days.

(21) Appl. No.: 17/444,399

(22) Filed: Aug. 4, 2021

(65) Prior Publication Data
US 2022/0050229 A1 Feb. 17, 2022

(30) Foreign Application Priority Data
Aug. 11, 2020 (KR) .......................... 10-2020-0100427

(51) Int. Cl.
*G02B 3/00* (2006.01)
*G02B 3/08* (2006.01)

(52) U.S. Cl.
CPC ......... *G02B 3/0043* (2013.01); *G02B 3/0031* (2013.01); *G02B 3/0068* (2013.01); *G02B 3/0075* (2013.01); *G02B 3/08* (2013.01); *G02B 2003/0093* (2013.01)

(58) Field of Classification Search
None
See application file for complete search history.

(56) References Cited

U.S. PATENT DOCUMENTS

| | | | |
|---|---|---|---|
| 2004/0130790 A1* | 7/2004 | Sales ................... | G02B 27/0961 359/619 |
| 2012/0125403 A1 | 5/2012 | Orlandi | |
| 2013/0242161 A1* | 9/2013 | Kobayashi ........... | H04N 23/957 348/340 |
| 2015/0293271 A1* | 10/2015 | Miyasaka ............ | G02B 5/0268 353/38 |
| 2016/0178913 A1* | 6/2016 | Endoh .................... | G03F 7/0005 359/627 |
| 2017/0285341 A1 | 10/2017 | Nakagawa et al. | |
| 2018/0113240 A1 | 4/2018 | Watanabe et al. | |
| 2018/0267214 A1* | 9/2018 | Rossi ..................... | G02B 27/48 |

(Continued)

FOREIGN PATENT DOCUMENTS

| | | |
|---|---|---|
| JP | H08166555 A | 6/1996 |
| JP | 2006350120 A | 12/2006 |

(Continued)

OTHER PUBLICATIONS

1st Office Action from Korea, Application No. 10-2020-0100427, dated Jan. 4, 2022, pp. 5.

*Primary Examiner* — Derek S. Chapel
(74) *Attorney, Agent, or Firm* — FisherBroyles, LLP; Susan M. Oiler

(57) ABSTRACT

An embodiment of the present disclosure may provide a microlens array including: an optical substrate configured to define multiple cells; and multiple microlenses distributed on the optical substrate and having angle profiles or tilting profiles, wherein angle profiles of the multiple cells are defined based on the shapes of edges of the cells, and tilting profiles of the multiple cells are defined based on the tilts of the microlenses or the tilt of the optical substrate.

20 Claims, 16 Drawing Sheets

(56) References Cited

U.S. PATENT DOCUMENTS

2019/0369297 A1* 12/2019 Arima .................. G02B 5/0221
2022/0326540 A1* 10/2022 Jolic .................... G02B 3/0043

FOREIGN PATENT DOCUMENTS

| KR | 10-1004500 B1 | 12/2010 |
| KR | 2013-0132770 A | 12/2013 |
| KR | 10-2018-0117684 | 10/2018 |
| KR | 10-2115544 B1 | 5/2020 |

* cited by examiner

*FIG. 13*
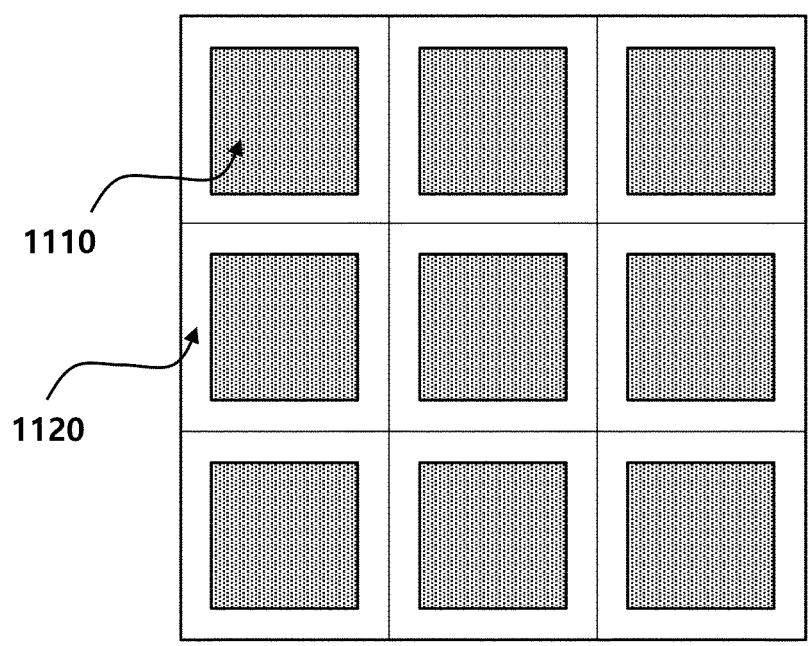
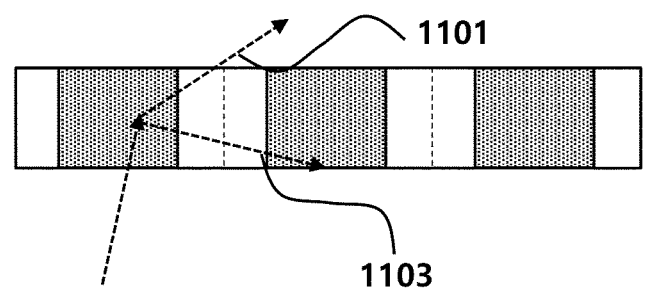

MICROLENS ARRAY HAVING RANDOM PATTERNS AND METHOD FOR MANUFACTURING SAME

CROSS REFERENCE TO RELATED APPLICATION

This application claims priority from Republic of Korea Patent Application No. 10-2020-0100427, filed on Aug. 11, 2020, which is hereby incorporated by reference in its entirety.

BACKGROUND OF THE INVENTION

1. Field of the invention

The present disclosure relates to a microlens array capable of transferring uniform light with an improved efficiency, based on microlenses having random patterns, and a method for manufacturing the same.

2. Description of the Prior Art

Widely used methods for identifying three-dimensional information include a stereo vision type, a structured light type, and a time-of-flight type.

A device for measuring the distance of an object includes a light source and a light diffusion device, regardless of the type of the method for identifying three-dimensional information. Light from the light source is directed to the object through the light diffuse device, and light reflected by the object is transferred to a receiver, thereby recognizing the object.

In order to acquire accurate object distance information in this process, light or laser from the light source needs to reach the object in a uniform manner. In order to homogenize light, a light diffusion device is commonly used, such as a diffractive optical element (DOE), an aspheric lens (element group), a polygon homogenized rod, or a microlens array.

The diffractive optical element and the aspheric lens have a problem of very small tolerance ranges, and the polygon homogenized rod has a problem of low light transmission efficiency compared with other optical elements. A microlens array which has little stray light and has no zero-diffraction order may be adopted as an optical element appropriate for solving such problems.

A conventional microlens array having regular arrangement has a brightness difference between a specific part and another part, due to the regular arrangement. As a result, diffraction patterns are formed, or a light intensity peak occurs in the specific part only.

In order to solve the above problems, an optical design for homogenizing light is necessary. Glass or plastic of the surface of a light diffusion device may be etched to provide a surface having random heights. Alternatively, the surface may be processed to have random patterns. As such, a light diffusion device may be designed such that the diffractive angle of light passing through the microlens array is variously adjusted.

In general, random patterns of a microlens array are manufactured through individual processes for respective light diffusion devices. Such random pattern generation requires considerable costs for individual processes, thereby increasing the process difficulty and increasing manufacturing costs of light diffusion devices.

In addition, during light diffusion device design, individual microlenses are designed regardless of the shape or angle of the arranged optical substrate, and two-dimensional planar array arrangement in the x-axis or y-axis direction is solely considered, thereby reducing the degree of freedom for forming random patterns. Therefore, a conventional microlens array has an insufficient degree of freedom of lens patterns, and a distance measurement device including the same as a light diffusion device has a limited capability of transferring light from a light source to the target uniformly.

SUMMARY OF THE INVENTION

In view of the above-mentioned background, it is an aspect of the present disclosure to provide a microlens array and a method for manufacturing the same, wherein random patterns are formed by a rotating profile or a tilting profile.

An embodiment of the present disclosure may provide a microlens array including: an optical substrate configured to define multiple cells; and multiple microlenses distributed on the optical substrate and having angle profiles or tilting profiles, wherein angle profiles of the multiple cells are defined based on shapes of edges of the cells and tilting profiles of the multiple cells are defined based on tilts of the microlenses or a tilt of the optical substrate.

In connection with the microlens array, each of the microlenses may be defined by a shape profile determining a surface shape of the microlens, a size profile determining a size of the microlens, or a pattern profile determining a pattern of the microlens.

In connection with the microlens array, the angle profiles or the tilting profiles of the multiple cells may be configured to give shape to a light beam in response to an intensity profile of light reaching a subject.

The microlens array may be divided into multiple regions corresponding to multiple light sources included in a distance measurement device and an angle profile or a tilting profile may be defined for each of the regions.

The microlens array may further include at least one auxiliary lens between the multiple cells.

The microlens array may further include micro-protrusions on a surface of each of the microlenses.

In connection with the microlens array, at least one blocking wall may be disposed between the multiple cells.

In connection with the microlens array, at least one photosensitive material may be attached between the multiple cells.

In connection with the microlens array, at least one groove is formed between the multiple cells by a glass-process.

Another embodiment of the present disclosure may provide a method for manufacturing a microlens array having a random disposition pattern, the method including: preparing an optical substrate including multiple cells; setting an angle profile based on a shape of an edge of each cell; setting a tilting profile based on a tilt of a microlens or a tilt of the optical substrate; and disposing multiple microlenses distributed on the optical substrate, based on the angle profile or the tilting profile.

The method for manufacturing a microlens array may further include forming the multiple microlenses through polymer hardening.

In connection with the method for manufacturing a microlens array, the multiple microlenses may be formed to have the same shape as that of the frame by hardening.

In connection with the method for manufacturing a microlens array, the frame may include at least one reference recess for reducing errors in repeated processes.

In connection with the method for manufacturing a microlens array, the frame may have repetitive predetermined patterns formed thereon.

In connection with the method for manufacturing a microlens array, the frame may be divided into multiple regions and each of the multiple regions may include at least one reference recess.

In connection with the method for manufacturing a microlens array, the frame may be divided into multiple regions and the multiple regions may respectively have different tilts.

In connection with the method for manufacturing a microlens array, the frame may be divided into multiple regions each of which always has the same surface shape when it is rotated.

In connection with the method for manufacturing a microlens array, the optical substrate may be divided into multiple regions corresponding to those of the frame and at least one blocking wall may be disposed between the multiple regions.

In connection with the method for manufacturing a microlens array, the optical substrate may be divided into multiple regions corresponding to those of the frame and microlenses of a minute size may be additionally disposed between the multiple regions.

As described above, according to the present disclosure, random patterns may be formed through rotation, thereby facilitating microlens array processes, and randomness may be improved by tilting lenses such that more uniform light is transferred to an object at a long or short distance.

In addition, according to the present disclosure, structural limitations occurring in the process of manufacturing a microlens array divided into multiple regions, and the uniformity of light reaching an object may be improved.

In addition, according to the present disclosure, parameters for design may be variously changed during a process of manufacturing a microlens, thereby increasing the randomness of lens patterns.

In addition, according to the present disclosure, a reference recess may be formed to reduce the irregularity of each region of the microlens array, and the yield and accuracy of lens manufacturing processes may thus be improved.

BRIEF DESCRIPTION OF THE DRAWINGS

The above and other aspects, features and advantages of the present disclosure will be more apparent from the following detailed description taken in conjunction with the accompanying drawings, in which:

FIG. 13 is a view describing a light leakage phenomenon of a microlens array;

DETAILED DESCRIPTION OF THE EXEMPLARY EMBODIMENTS

Figure 1:
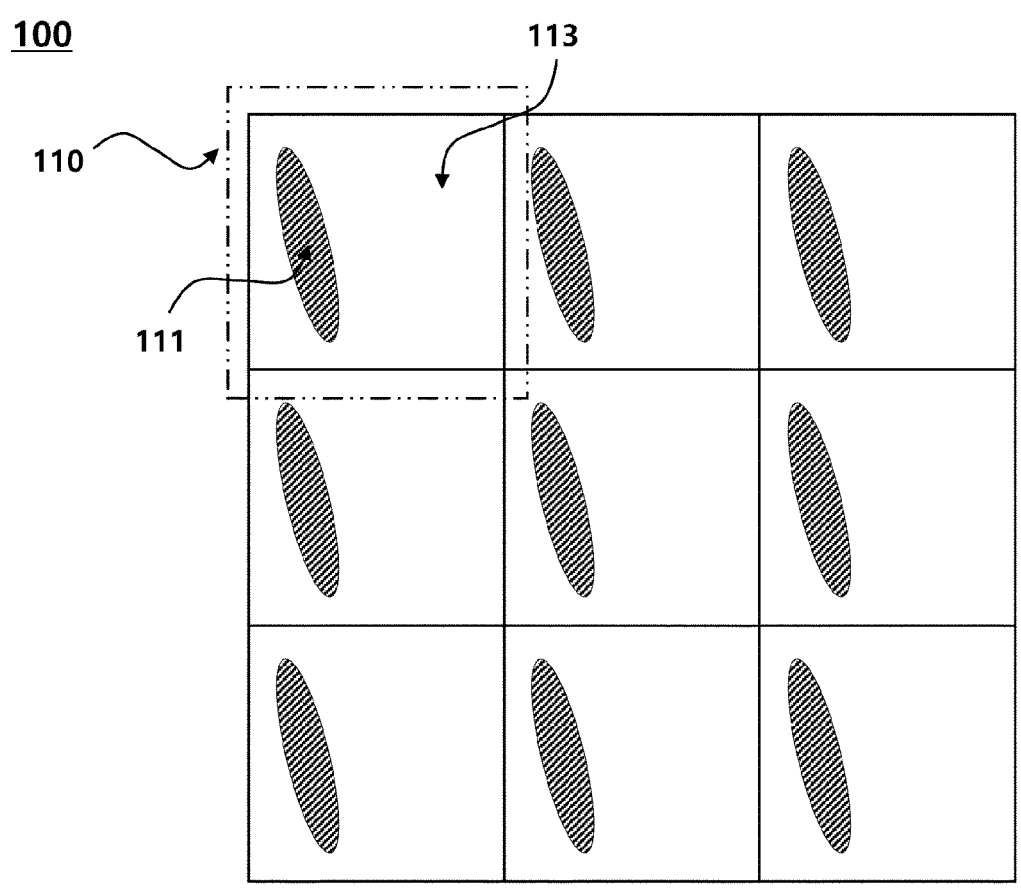
FIG. 1 illustrates a conventional microlens array having repeated patterns.

Hereinafter, some embodiments of the present disclosure will be described in detail with reference to the accompanying drawings. In adding reference numerals to elements in each drawing, the same elements will be denoted by the same reference numerals, if possible, although they are shown in different drawings. Further, in the following description of the present disclosure, a detailed description of known functions or configurations incorporated herein will be omitted when it is determined that the description may make the subject matter of the present disclosure unclear.

In addition, terms, such as first, second, (a), (b) or the like may be used when describing elements of the present disclosure. These terms are merely used to distinguish one element from other elements, and a property, an order, a sequence and the like of a corresponding element are not limited by the terms. It should be noted that if it is described in the specification that one element (a first element) is "connected," "coupled" or "joined" to another element (a second element), a third element may be "connected," "coupled," and "joined" between the first and second elements, although the first element may be directly connected or joined to the second element.

FIG. 1 illustrates a conventional microlens array having repeated patterns.

Referring to FIG. 1, a conventional microlens array 100 may include an optical substrate 113 and microlenses 111.

The microlens array 100 should be manufactured to correspond to a size required in a distance measurement device. As the size of the optical substrate 113 increases, a difficulty in a process increases, and thus one microlens array 100 is manufactured by generating separate cells 110 and bonding the cells to each other. Each cell of the microlens array 100 may be formed by hardening a polymer melt solution.

The microlens array 100 may be formed by repeatedly disposing multiple cells 110, and conventionally, as illustrated in FIG. 1, the cells 110 are typically arranged with identical directivity on a two-dimensional plane in order to form a microlens array. That is, light passing through a lens may not be homogenized due to patterns repeated in the process of replicating the cell 110.

In the conventional microlens array 100, due to regular arrangement of the cells 100 having the same pattern, the brightness of a specific portion is different from the brightness of other portions, and thus a diffractive pattern may be formed, or a light intensity peak may occur in only the specific portion. Multiple beams of light having passed through a microlens array with regular arrangement interfere with each other, and the uniformity of light reaching an object is reduced.

Figure 2:
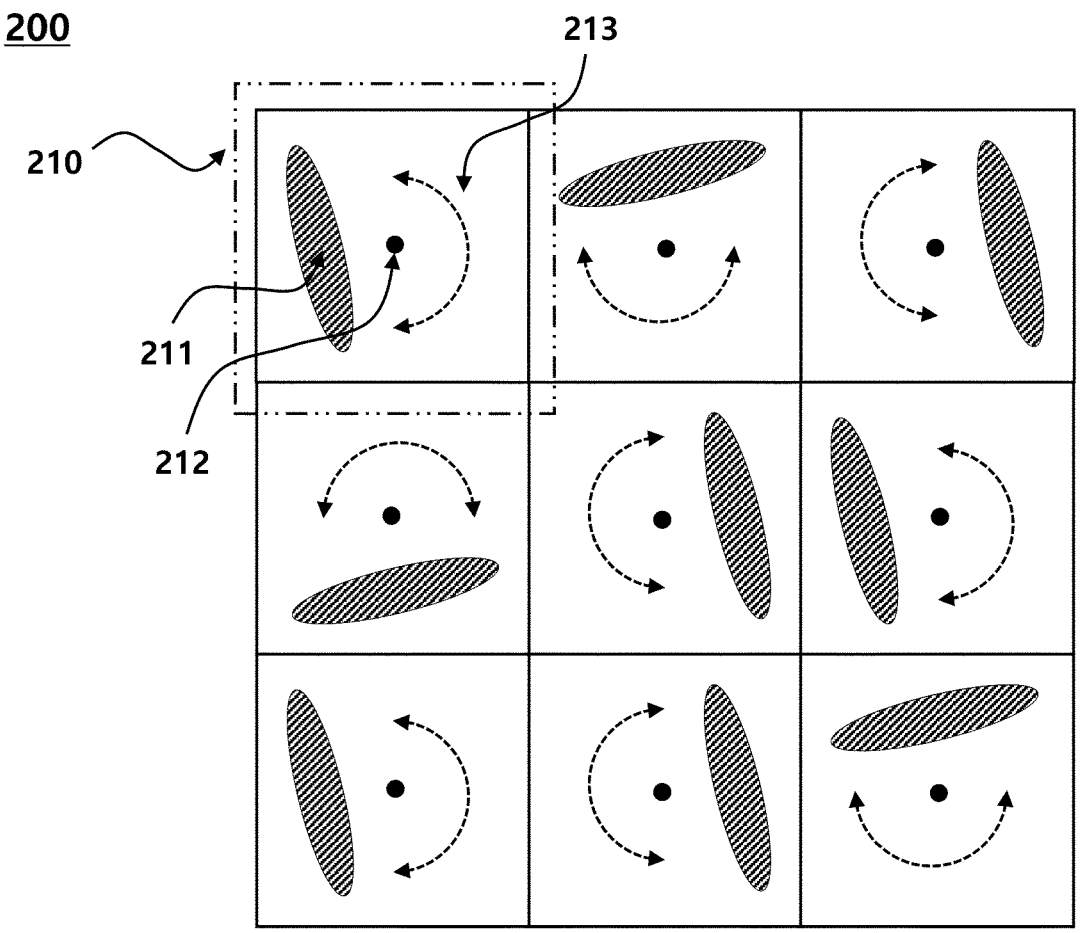
FIG. 2 is a first illustration showing a microlens array in which random patterns are formed through rotation.

FIG. 2 is a first illustration showing a microlens array in which random patterns are formed through rotation.

Referring to FIG. 2, a microlens array 200 may include an optical substrate 213 and microlenses 211.

The optical substrate 213 may be formed of glass or plastic, which is a light-transmitting material so as to allow light to pass, and an appropriate material may be adopted so as not to reduce luminance efficiency, but is not limited thereto. Further, the microlenses 211 may be attached to the optical substrate 213, or the microlenses 211 may be formed by physically or chemically processing the optical substrate 213. For example, the microlenses 211 may be formed by hardening a polymer melt solution.

A curable resin composition such as ultraviolet curable urethane acrylate (PUA), polyesters, epoxy-based resin, or (meth)acrylate-based resin may be used as a material of the optical substrate 213 or the microlenses 211. The optical substrate 213 may be variously configured as necessary in view of properties of an optical element, such as transparency, transmissivity, and a refractive index.

For example, the optical substrate 213 or each of the microlenses 211 may include an optical plate or an optical film such as an acrylic film, a polystyrene film, or a polyethylene terephthalate film.

In another example, the optical substrate 213 or each of the microlenses 211 may include a mixture including at least one among UV-curable polymer, polycarbonate, acryl, fused silica, silicone, and a composition thereof. Cells 210 on the optical substrate 213 may have a random array in order to uniformly irradiate an object with output light, and may generate scattered light by adjusting the shape, position, curvature, aspheric coefficient, size, etc. of a single lens or by using a pseudorandom number arrangement method or the like.

Each microlens 211 may be defined by a shape profile determining the surface shape of the microlens, a size profile determining the size of the microlens, or a pattern profile determining the pattern of the microlens.

Here, the profile may indicate a one-dimensional directivity according to a reference line of a microlens. Further, the profile may imply indicating a cross-section of a microlens by a two-dimensional graph. Further, the profile may indicate a three-dimensional shape of a microlens.

Further, the microlenses 211 disclosed in FIG. 2 are simplified in order to describe an increase in randomness according to a profile, and multiple microlenses 211 may be formed in the cells 210 in various shapes and patterns.

The size of the microlens array 200 and the cells 210 may be variously configured depending on the type of light source and the purpose of lighting.

Patterns of the microlenses 211 may be randomized by combining predetermined parameters such as the curvature radius of each microlens 211, the sag of the microlens, the diameter of the microlens, the emittance angle of light, a focal distance, and a relative vertical position or horizontal position.

Due to processing limitations of the conventional microlens array, the microlens array 200 having a necessary size may be generated through a process of individually generating single cells 210 and then bonding the same to each other. Each of the single cells 210 may be manufactured so as to have a random pattern. However, for example, in the microlens array 200, when N single cells 210 are repeated, the N cells are repeated in an identical form, and thus the degree of scattering and the uniformity of light are reduced. A microlens array having the above-type regular period may be called a regular periodic type micro lens array (R-MLA).

According to an embodiment, the single cells 210 may be individually generated, and multiple cells 210 may be used to form the microlens array 200 in which random patterns are formed. For example, multiple cells 210 having different directivities are bonded to each other to form one microlens array 200. In another example, castings having different directivities may be formed in order to form the multiple cells 210 having different directivities, and a single microlens array 200 may be formed.

The cells 210 according to an embodiment may be formed in a size having a minimum unit for uniformly transferring light or rays. If the cells 210 are excessively small, the cells 210 may have large diffusion angles. In this case, light reaching an object may not be uniformly transferred thereto.

For example, each of the cells 210 may include a rotation axis 212, and may rotate in various directions.

According to an embodiment, the cells 210 may have a polygonal shape. For example, when the cells 210 have a quadrangular shape, the cells 210 may rotate in four directions. In this case, a pattern, capable of being selected by each of the cells of the microlens array 200 in which random patterns are formed, increase by four times for each cell 210, and thus the degree of freedom for forming the random patterns increases by four times.

According to an embodiment, when a microlens array is formed of nine cells, patterns can be formed by one identical cell, and thus $4^9$ types of randomness can be obtained. When a random process is performed for each cell 210, a manufacturing cost may be reduced compared with an existing process of forming random patterns for individual cells 210. When the microlens array is formed of nine cells, the number of times of processing required to individually form nine regions may be reduced.

Theoretically, randomness may be increased as much as possible by reducing the area occupied by the cells 210 and increasing the number of cells 210 included in the microlens array 200. However, each of the cells 210 should be formed as a minimum unit for uniformly transferring light or rays, and thus the minimum unit for forming random patterns may be differently determined based on various conditions such as the size, shape, arrangement, etc. of an optical substrate or a microlens.

As described above, an angle profile may be defined based on the shape of the edge of each of the cells 210, an imaginary reference line, a predetermined drawing method, etc.

According to an embodiment, an angle profile may be configured with reference to one polygonal surface. For example, when one surface has a quadrangular edge, an angle profile may include four angle profiles of 90 degrees, 180 degrees, 270 degrees, and 360 degrees with reference to four rotatable types.

According to another embodiment, the angle profile may be configured based on an imaginary reference line. For example, six imaginary reference lines may be symmetrically disposed, and the angle profile may include six angle profiles of 60 degrees, 120 degrees, 180 degrees, 240 degrees, 300 degrees, and 360 degrees with reference to six rotable types.

According to another embodiment, the angle profile may be configured based on a predetermined drawing method. For example, a minimum unit of the angle profile may be configured to be 1 degree on the basis of a straight line equally divided through the length of an arc or the center of a circle.

An angle profile of each cell 210 may be determined by sequential clockwise rotation or counterclockwise rotation. However, the angle profile of each cell 210 may be randomly configured, thereby maximizing randomness of patterns of the microlens array.

The microlens array 200 may be included as one element of a distance measurement device, and may allow light transferred from a light source (now shown) to pass therethrough and reach a desired position on a subject.

The distance measurement device may include multiple light sources (not shown) in order to increase the amount of light reaching a subject. The microlens array 200 may be divided into multiple regions—for example, the cells 210—, and may transmit, at various radiation angles, light transferred from the multiple light sources.

When positions of the multiple light sources (not shown), from which light is transferred, in the distance measurement device correspond to the multiple regions of the microlens array 200, a desired amount of light may be transferred to a subject. The intensity of light reaching each region of the subject may be adjusted by changing the surface shape of the microlens array 200.

The light amount distribution of light reaching the subject may be defined as an intensity profile.

Angle profiles of the multiple cells 210 may be configured so as to give shape to light in accordance with a preconfigured intensity profile. According to an embodiment, the angle profiles may be configured such that an averagely identical number of light beams reach a subject positioned in a distant region.

Figure 3:
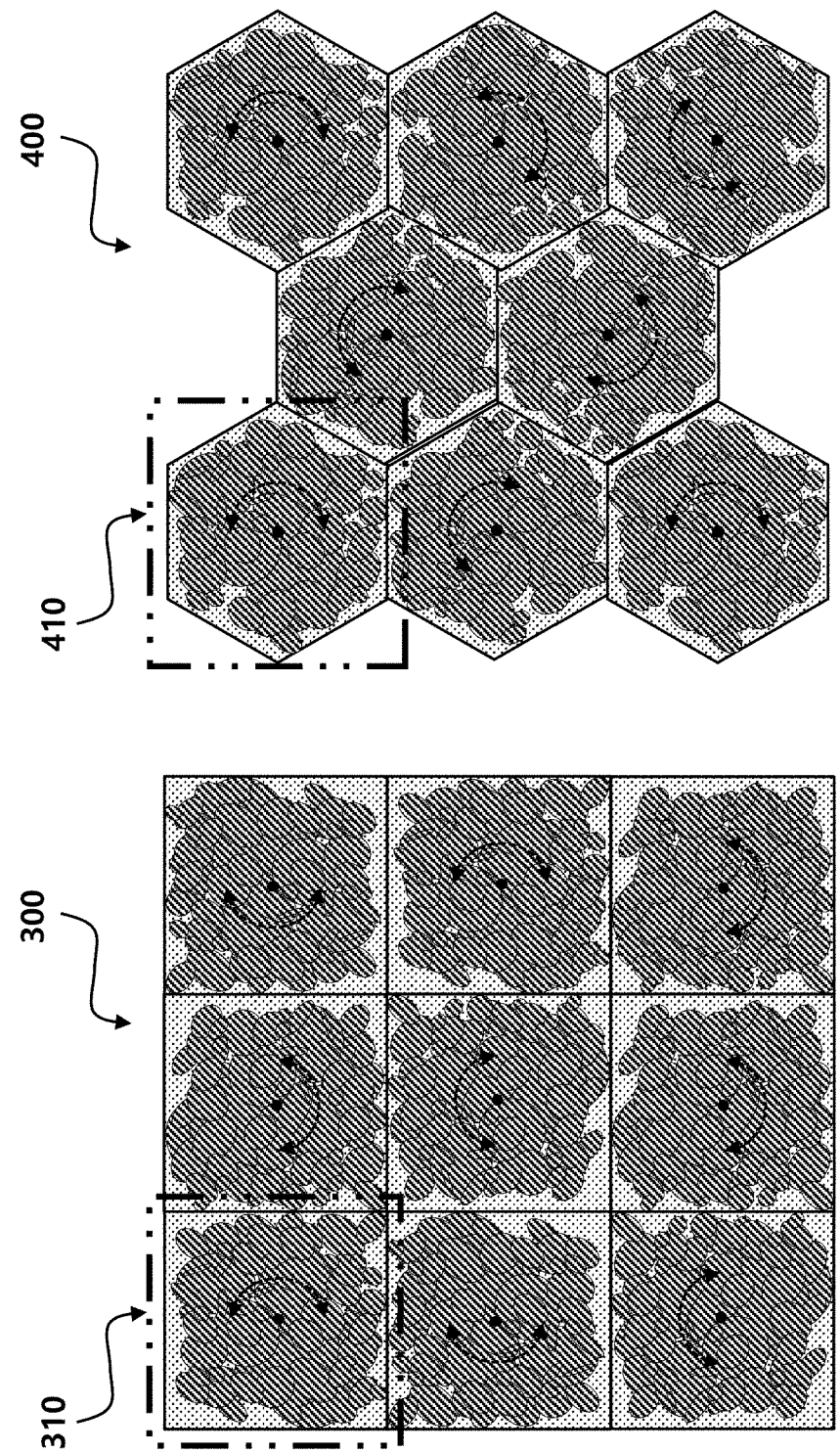
FIG. 3 illustrates the difference between random patterns according to the shape of a cell.

FIG. 3 illustrates the difference between random patterns according to the shape of a cell.

Referring to FIG. 3, it is possible to identify the difference between random patterns according to the shape of a cell.

According to an embodiment, the shape of a cell may be variously configured based on the type of a light diffusion device required for the distance measurement device.

For example, the edge of each cell 310 of a microlens array 300 may have a quadrangular shape, and the edge of each cell 410 of a microlens array 400 may have a hexagonal shape.

Multiple microlenses in an optical substrate may be randomly disposed or formed regardless of the shapes of the cells 310 and 410. The path of light passing through each of the microlens arrays 300 and 400 may be changed by adjusting the curvature, aspheric coefficient, size, shape, or arrangement of a single microlens. A microlens in a single cell may be manufactured by various methods in consideration of the transmissivity of light and luminance efficiency.

Figure 4:
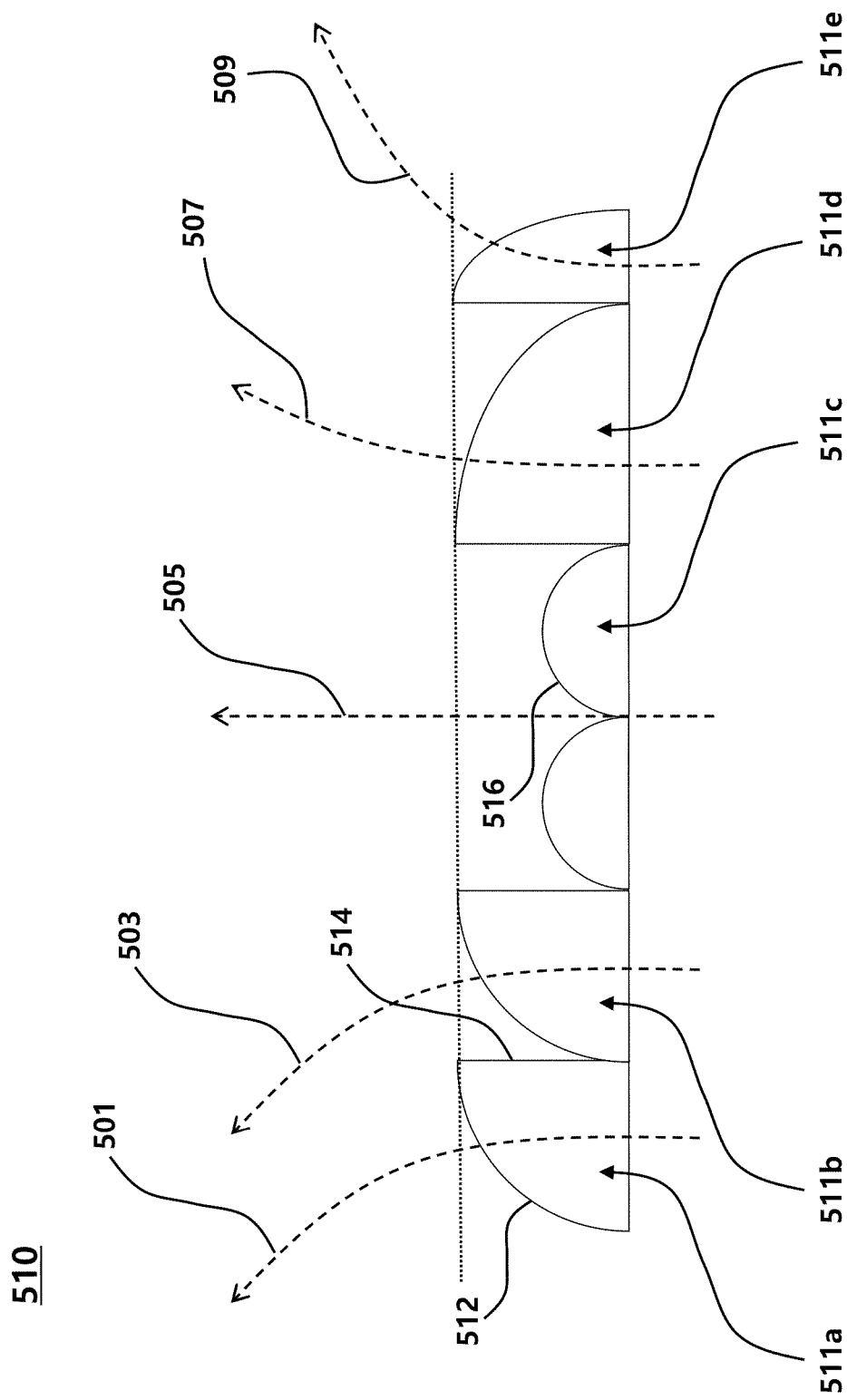
FIG. 4 is a first illustration showing a microlens array which changes a light path through tilting.

FIG. 4 is a first illustration showing a microlens array which changes a light path through tilting.

Figure 5:
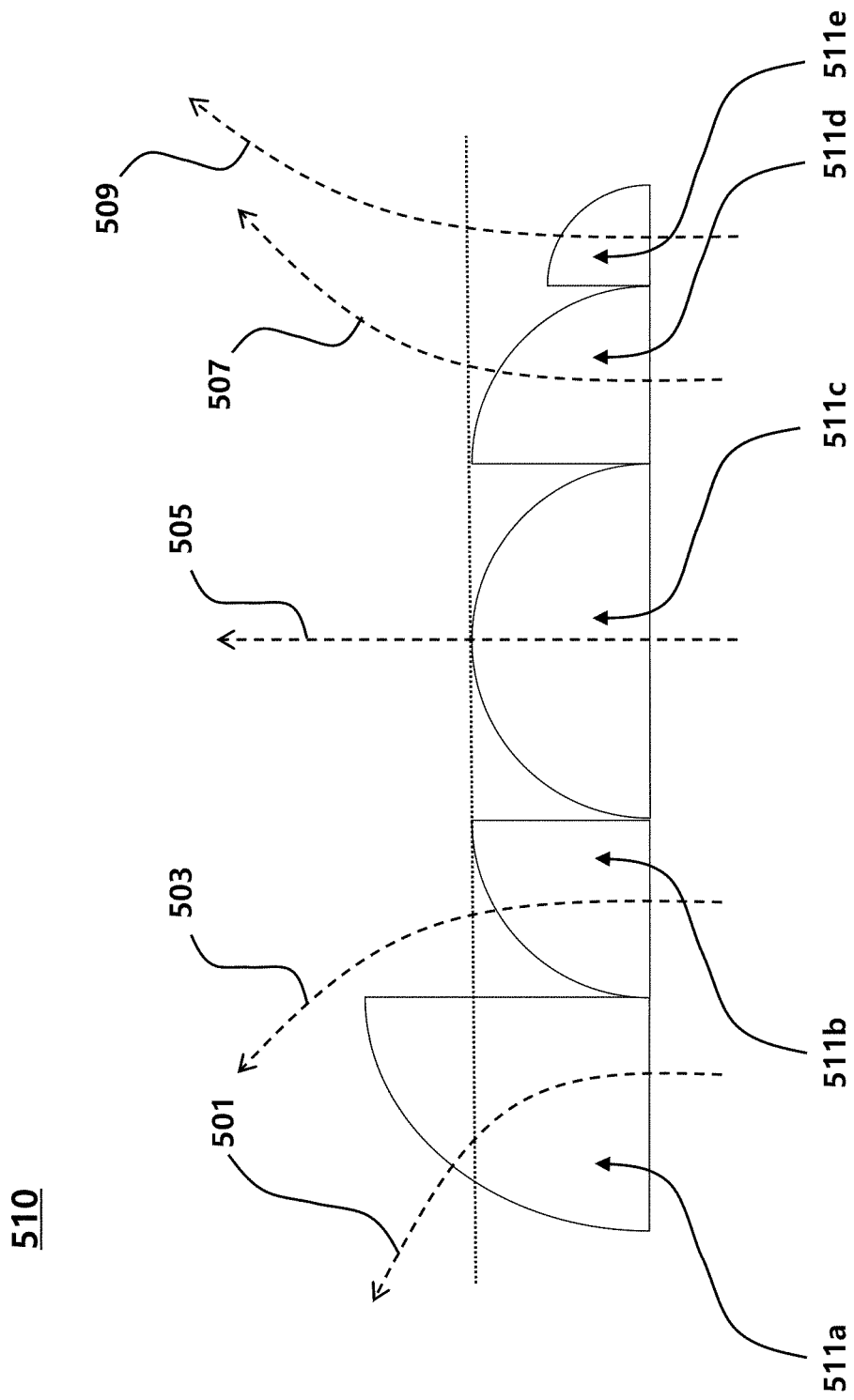
FIG. 5 is a second illustration showing a microlens array which changes a light path through tilting.

FIG. 5 is a second illustration showing a microlens array which changes a light path through tilting.

Figure 6:
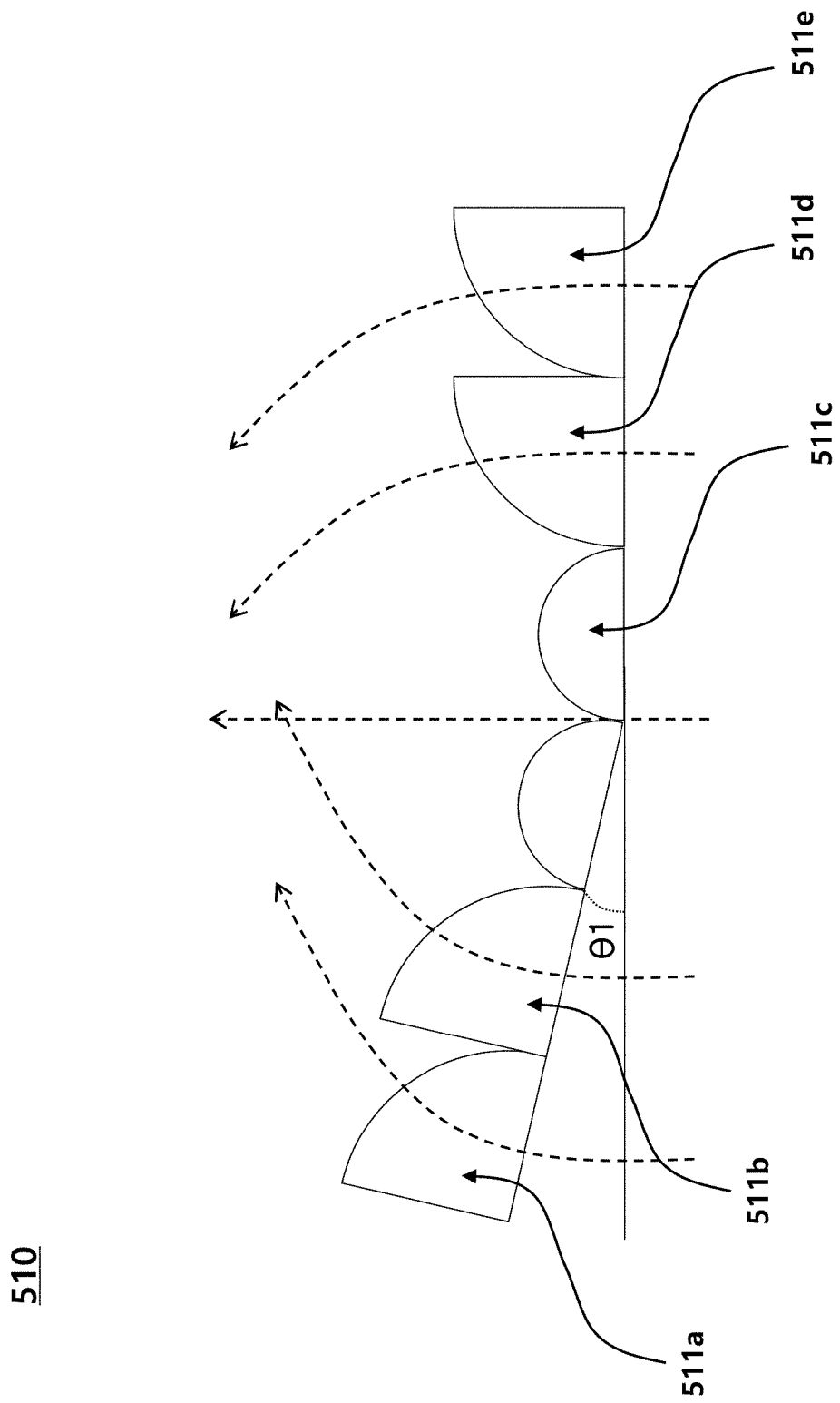
FIG. 6 is a third illustration showing a microlens array which changes a light path through tilting.

FIG. 6 is a third illustration showing a microlens array which changes a light path through tilting.

Referring to FIGS. 4 to 6, a microlens array may change a light path through tilting.

In the conventional microlens array, an irregular array is formed in an x-axis or y-axis two-dimensional plane, and randomness is formed by simply adjusting parameters such as the curvature, aspheric coefficient, and size of a lens.

Referring to FIG. 4, a cell 510 may include the multiple microlenses 511a, 511b, 511c, 511d, and 511e. The multiple microlenses may use various parameters based on respective desired light paths 501, 503, 505, 507, and 509.

According an embodiment, a parameter may be a tilting profile. The tilting profile may be defined based on the tilt or deflection of a lens itself, and may be defined by forming the tilt or deflection of an optical substrate. When the tilting profile is changed, the path of light passing through a microlens or a cell including a microlens may be changed.

The tilt or deflection of a lens itself may be an angle by which a ratio of the vertical-axis length of the lens to the horizontal-axis length thereof is defined or an angle by which the direction of light in which multiple particles are averagely transferred is defined.

The tilting profile defined based on the tilt or deflection of the lens itself may provide an additional degree of freedom in the z-axis direction, compared with the conventional method for forming random patterns in an x-axis or y-axis two-dimensional plane.

The tilting profile considering a lens tilt in the z-axis direction, etc. is for the purpose of increasing randomness through an additional lens design in the z-axis direction.

Figure 7:
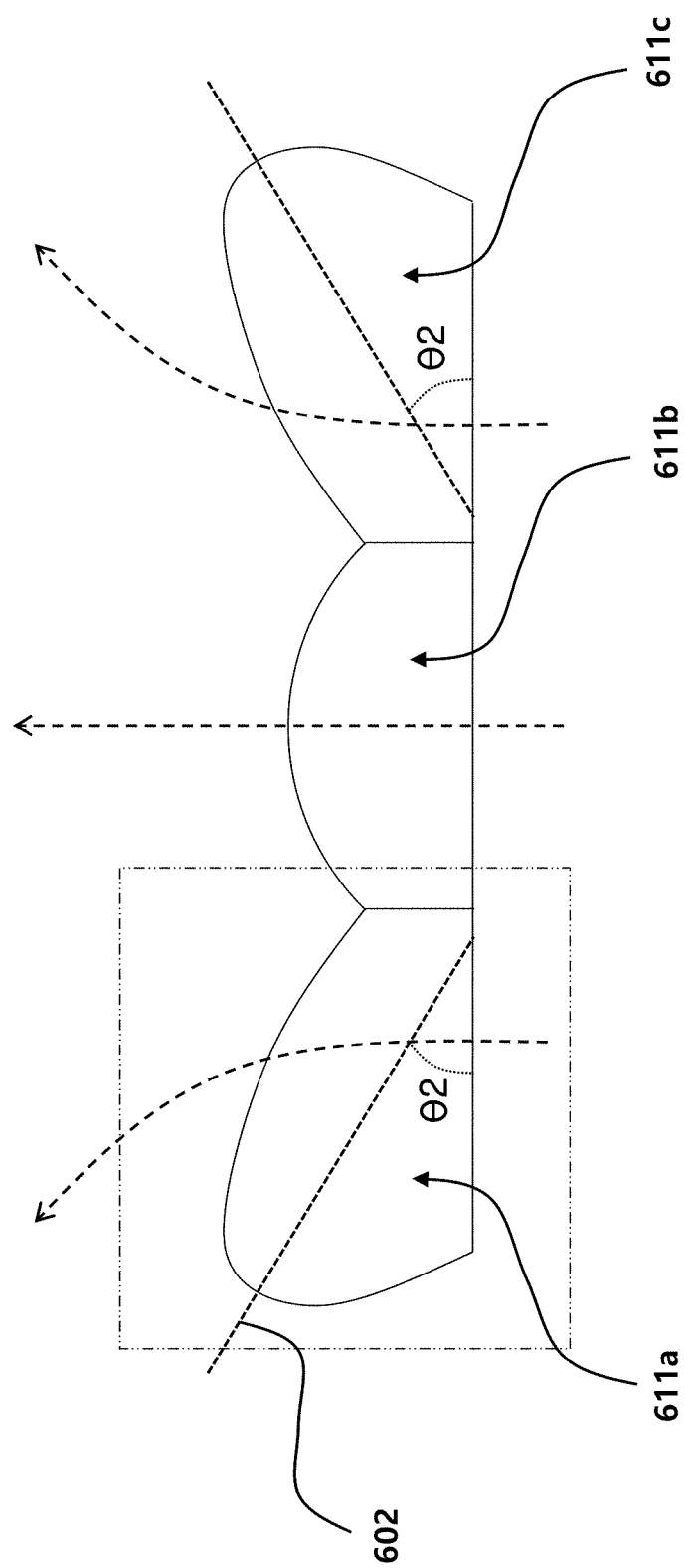
FIG. 7 is a fourth illustration showing a microlens array which changes a light path through tilting.

For example, as illustrated in FIG. 7, a tilt θ2 of a lens may be defined based on a predetermined imaginary line 602, and the direction of light reaching an object may be adjusted based on the tilt θ2 of the lens.

The tiling profile may be individually defined based on the shape, type, or arrangement of a microlens.

According to an embodiment, when a lens has a spherical shape, an angle may be defined based on an imaginary line from the center of a sphere to a portion of the surface thereof. For example, when a cut portion of a sphere is used as a microlens 511a, an angle may be defined based on the center portion of a first surface 512 of the microlens. In this case, a tilting profile of the sphere may be defined as 45 degrees. In another example, when the portion of the sphere is used as the microlens 511a, the angle of the microlens may be defined based on a second surface 514 of the microlens. When the second surface 514 is perpendicular to an optical substrate, the tilting profile of the sphere may be defined as 45 degrees.

According to an embodiment, a tiling profile may be defined by a correlation between a length on a plane and a height perpendicular to the plane. For example, when a ratio of the radius of a microlens on a plane and the height thereof perpendicular to the plane is 1:1, a tilting profile may be defined as 1, and when a ratio of the radius of a microlens on a plane and the height thereof perpendicular to the plane is 2:1, a tilting profile may be defined as 0.5.

According to another embodiment, the tilting profile may be defined by a correlation between the area of an orthogonal projection on a plane and the area of the surface thereof. The height of a mirolens perpendicular to the plane may be additionally considered in calculation. For example, when a ratio of the area of an orthogonal projection of a microlens on a plane and the area of the surface thereof is 1:2, a tilting profile may be defined as 2. In another example, when the height of a microlens is 10 micrometers, a tilting profile may be defined as 0.2 obtained by dividing 2, which is an existing tilting profile, by 10. In this case, there is an advantage in that a tilting profile for each height is normalized, and thus a tilting profile of an individual microlens may be defined based on a unified reference.

The tiling profile of the individual microlens may be associated with the direction of light reaching an object. A first light path 501 may be defined by a tilting profile of the microlens 511a.

By the tilting profile of the individual microlens, the microlens 511a may be configured to have the first light path 501, a microlens 511b may be configured to have a second light path 503, a microlens 511c may be configured to have a third light path 505, a microlens 511d may be configured to have a fourth light path 507, and a microlens 511e may be configured to have a fifth light path 509.

According to an embodiment, the cell 510 including five microlenses 511a, 511b, 511c, 511d, and 511e may have randomness of five times or more. For example, if there are M (M is a predetermined natural number) microlens array methods using a two-dimensional array, $5M^L$ or more different random patterns may be formed when the cell has L (L is a predetermined natural number) tilting profiles.

Referring to FIG. 5, multiple microlenses 511a, 511b, 511c, 511d, and 511e may be formed to have different heights, sizes, shapes, spatial locations, and numbers.

The multiple microlenses 511a, 511b, 511c, 511d, and 511e may use various tilting profiles according to respective desired light paths 501, 503, 505, 507, and 509.

Referring to FIG. 6, a tilting profile may be defined based on additional tilting of an optical substrate. The tilt θ1 of the optical substrate may be defined in comparison with a plane. In this case, the tilt of the optical substrate may form the tilt of the entirety or a part of the cell 510.

According to an embodiment, a left surface may have a predetermined tilt θ1, and a right surface may be a flat surface with no tilt. The predetermined tilt θ1 of the left surface is formed, and thus it is easy to form random patterns and provide the degree of freedom in the z-axis direction.

According to another embodiment, a cross-section of the cell 510 may spirally rotate and may have an individual tilt θ1. In this case, the tilts of a flat surface and the cross-section of the optical substrate may gradually increase or decrease through rotation. In this case, a method for forming a pattern of a microlens array is diversified.

A change in the light path of an individual microlens may be more accurately configured through a tilting profile based on the additional tilting of the optical substrate.

FIG. 7 is a fourth illustration showing a microlens array which changes a light path through tilting.

Referring to FIG. 7, a cell 610 may include asymmetric microlenses 611a and 611c and a symmetric microlens 611b.

The tilt θ2 of the lenses may be defined based on a predetermined imaginary line 602, and the direction of light reaching an object may be adjusted based on the tilt θ2 of the lenses.

A tilting profile may be defined based on the tilt θ2 of the lenses.

The microlenses 611a and 611c formed in the cell 610 are not limited to the above-described shape, and may have a shape as in FIG. 6 in which end parts thereof are all filled.

Figure 8:
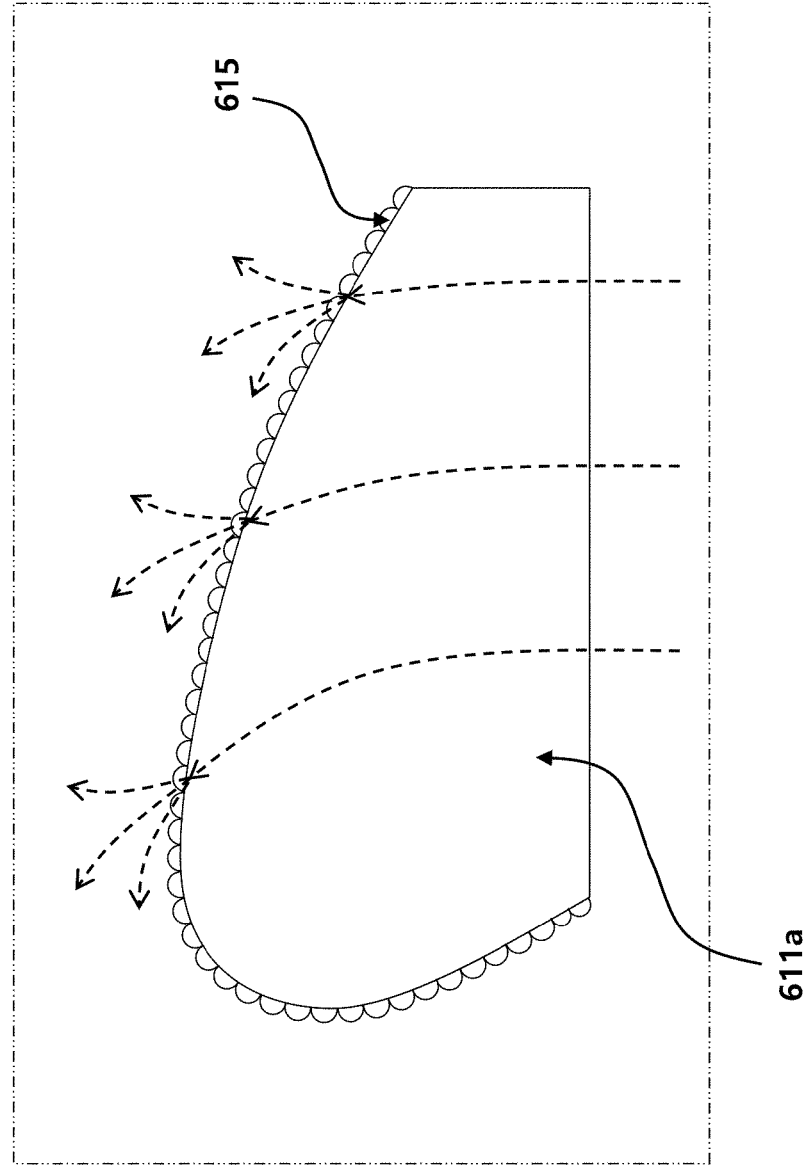
FIG. 8 is an enlarged view of microstructures on the surface of a microlens array according to an embodiment.

FIG. 8 is an enlarged view of microstructures on the surface of a microlens array according to an embodiment.

Referring to FIG. 8, the microlens 611a may include multiple microstructures 615 formed on the surface thereof.

Processes for the multiple microstructures 615 may include micro-replication, hot embossing, injection-molding, reactive-ion etching, ion-beam milling, or single-point laser writing. The processes may also include a physical cutting or attaching process, and may include a chemical etching process. However, the multiple microstructures 615 may be formed by a predetermined method which is not limited thereto.

The multiple microstructures 615 may have the same size and shape, but it is desirable to add randomness by predefined parameters.

For example, the microstructures may have predetermined geometric shapes, and may have outer boundaries while having a polygonal shape. Light may be more efficiently and uniformly diffused based on the microstructures.

The multiple microstructures 615 according to an embodiment may be formed by processing the microlens 611a by means of a predetermined method, but separate structures may be attached or disposed on the microlens 611a.

Figure 9:
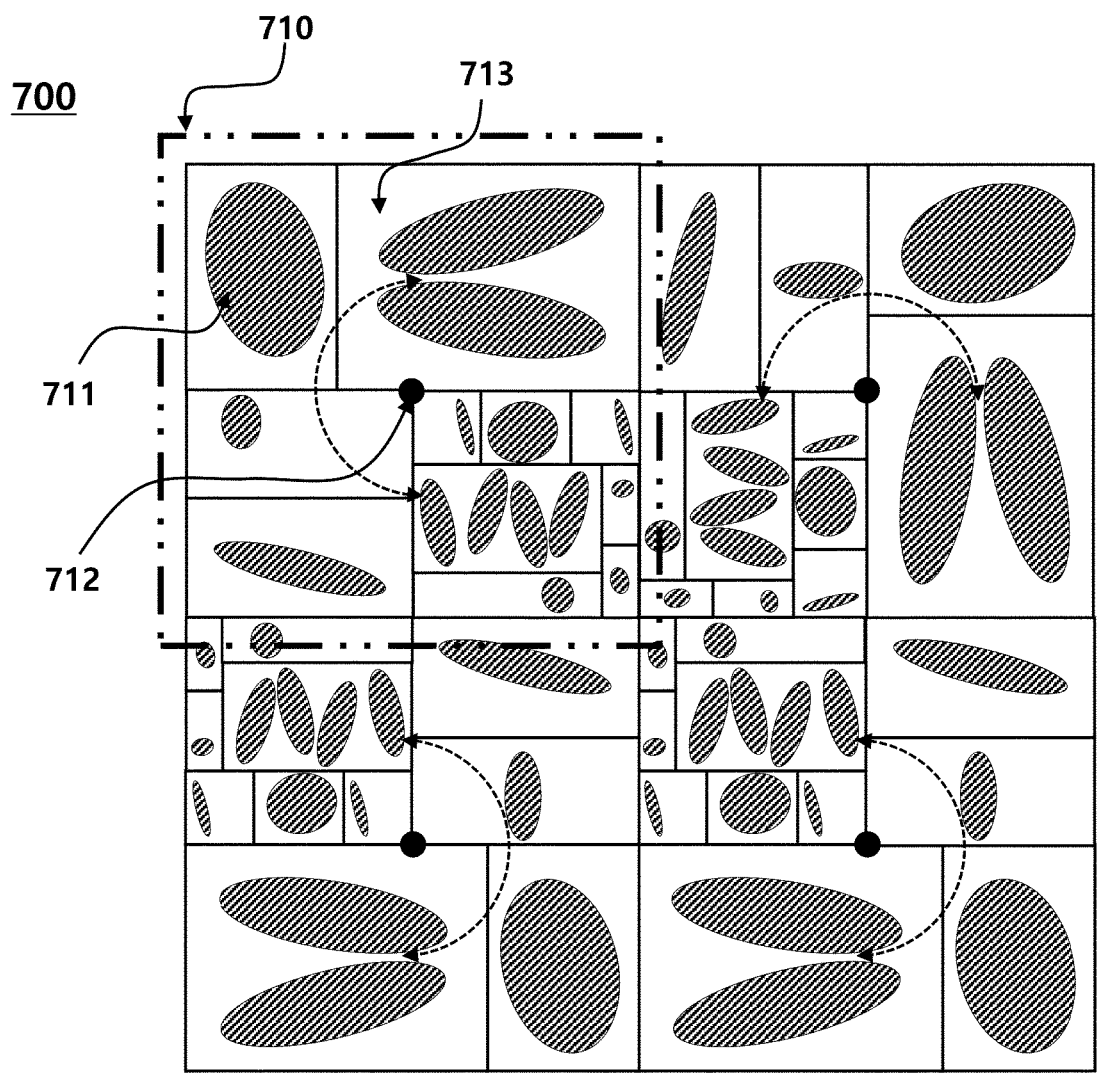
FIG. 9 is a second illustration showing a microlens array in which random patterns are formed through rotation.

FIG. 9 is a second illustration showing a microlens array in which random patterns are formed through rotation.

Referring to FIG. 9, a cell 710 may be divided into multiple regions. An optical substrate 713 may be divided by various methods such that the multiple regions form the cell 710, and the size, shape, and arrangement of the multiple regions may be variously determined according to a preconfigured regulation. For example, the cell 710 may be formed by a combination of multiple rectangles. Each region may be provided with at least one microlens 711. A microlens array 700 may be formed of multiple cells 710, each of which rotates about a rotation axis 712.

For example, the cells 710 are square regions, but the regions may form various patterns through a combination of squares or rectangles. Multiple microlenses 711 may be disposed in each of the regions, and thus randomness may be increased.

According to an embodiment, the microlens array(700) having increased randomness may be formed by rotating the cell 710, divided into multiple regions, and the multiple microlenses 711, and using the cells 710 having the same pattern.

When the lens patterns as in FIG. 9 are formed, randomness inside one cell 710 may be increased, and thus the lens patterns may become irregular. A method for dividing the internal region of one cell 710 may be variously defined based on processing costs and processing conditions.

Figure 10:
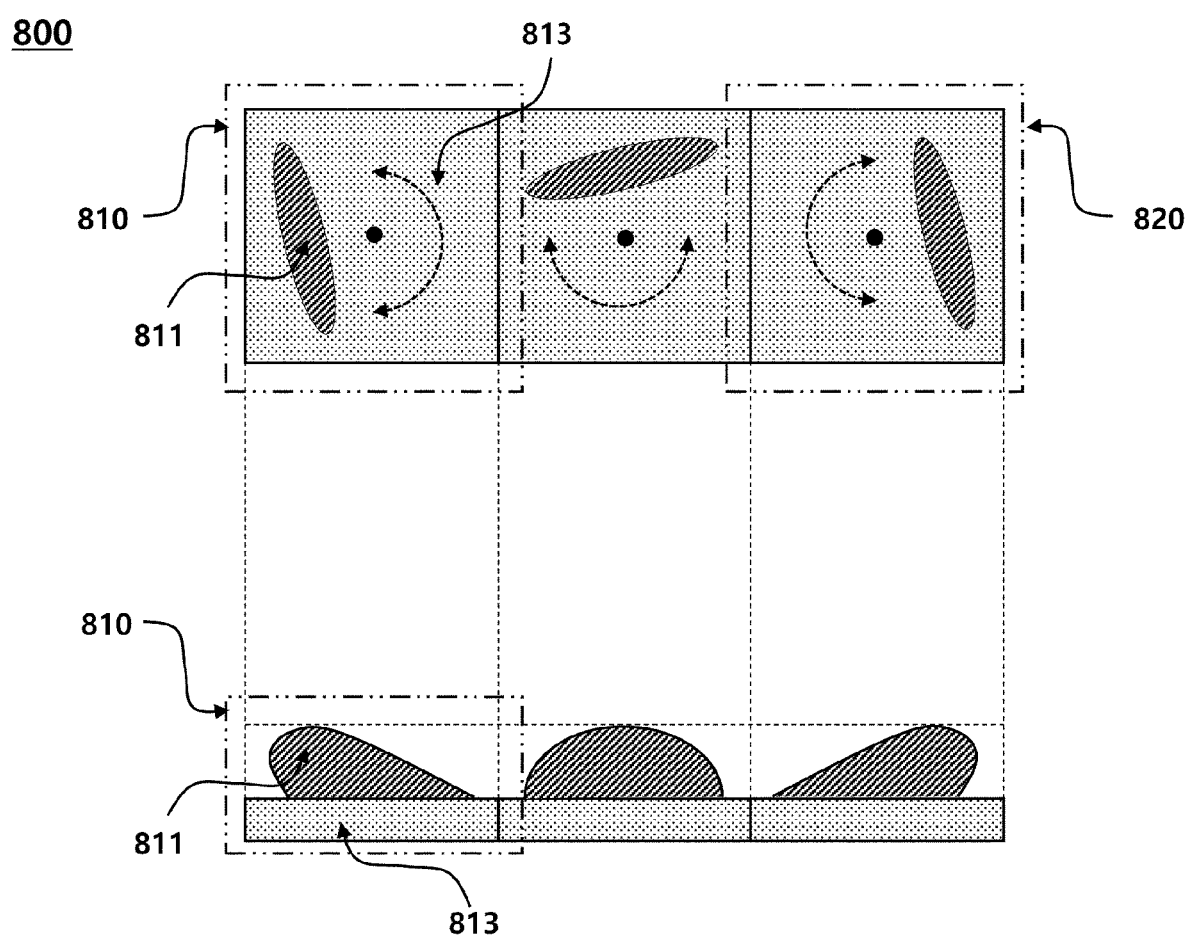
FIG. 10 is a first illustration showing a microlens array manufactured through rotation and tilting.

FIG. 10 is a first illustration showing a microlens array manufactured through rotation and tilting.

Figure 11:
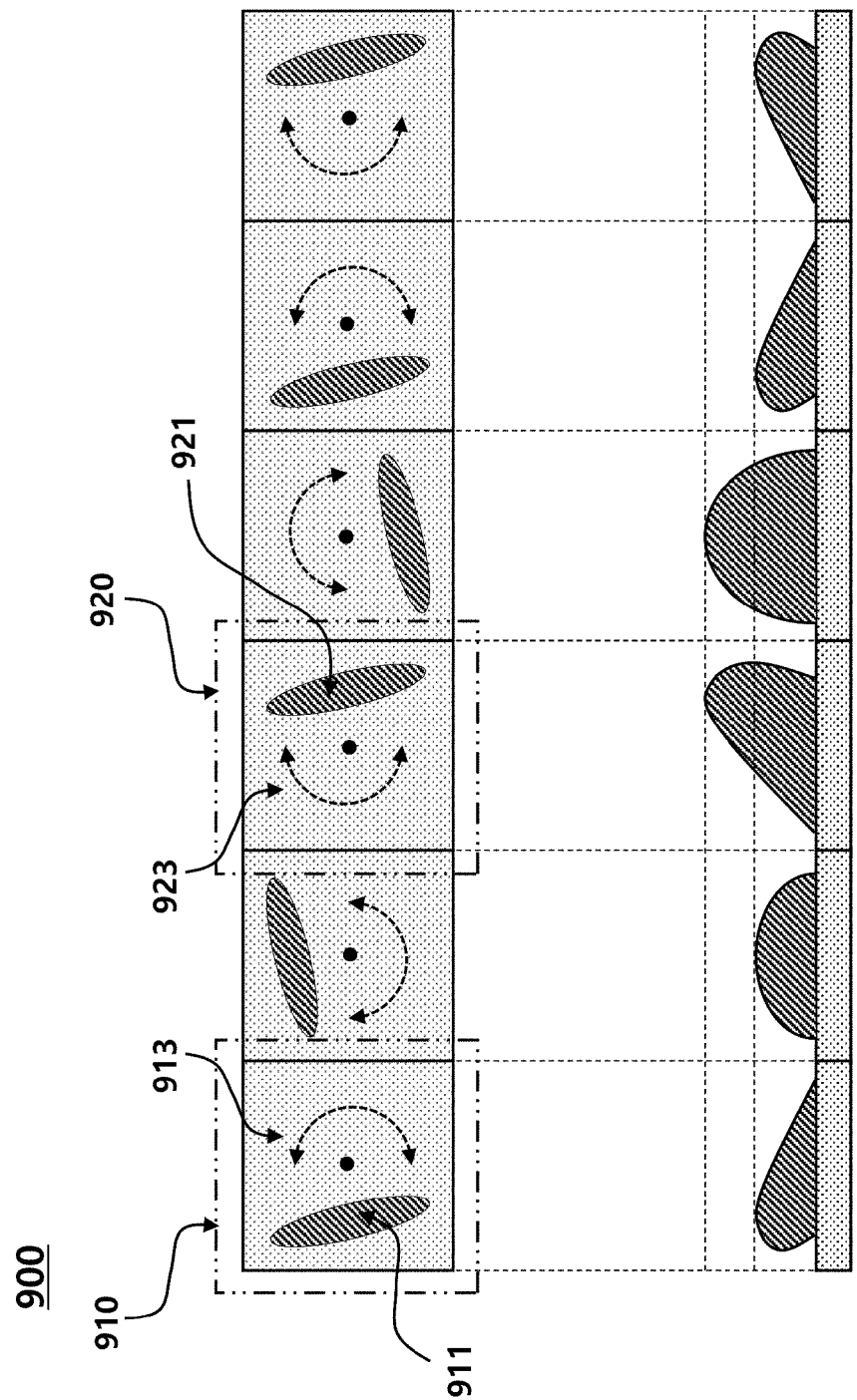
FIG. 11 is a second illustration showing a microlens array manufactured through rotation and tilting.

FIG. 11 is a second illustration showing a microlens array manufactured through rotation and tilting.

Referring to FIGS. 10 and 11, microlens arrays 800 and 900 having random patterns may be formed through rotation and tilting.

In FIG. 10, in a cell 810 of a microlens array 800, a microlens 811 having a tilting profile may be formed on an optical substrate 813. Further, another cell 820 having a physical structure identical thereto may be defined so as to have an angle profile that is different from that of the cell 810. In this case, tilting profiles of the cells 810 and 820 may be identically defined, but random patterns may be formed by adjusting angle profiles.

FIG. 11 illustrates a microlens array 900 including multiple cells 910 and 920 which have different tilting profiles and angle profiles. A tilting profile and an angle profile of a microlens 911 of the cell 910 may be different from those of a microlens 921 of another cell 920.

It is desirable that a tilting profile or an angle profile of each microlens is individually configured. However, only tilting profiles or angle profiles of some microlenses may be selectively configured in consideration of processing costs.

It is desirable to configure a tilting profile and an angle profile, together with parameters such as the curvature, aspheric coefficient, size, etc. of a lens, for forming an irregular array in a two-dimensional plane.

According to an embodiment, when an array is irregularly formed through a tilting profile and an angle profile, the degree of difficulty in a random array can be reduced and a cost problem can be solved.

Figure 12:
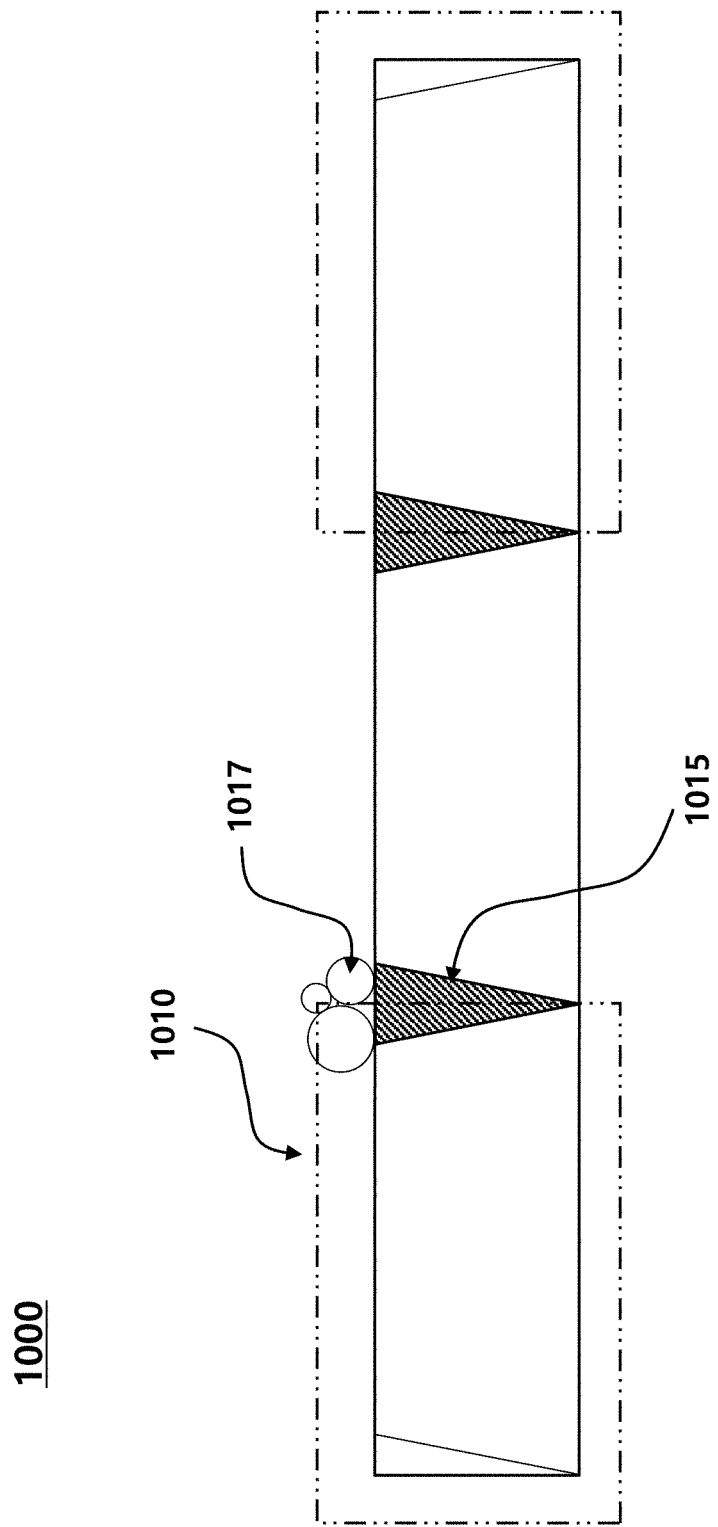
FIG. 12 is an enlarged view of the boundary surface between microlenses.

FIG. 12 is an enlarged view of the boundary surface between microlenses.

Referring to FIG. 12, a gap 1015 may be formed at a boundary surface between cells 1010 of a microlens array 1000. The gap 1015 may be formed due to an error in processing the cells 1010. However, the gap 1015 may also be formed in a bonding or attaching process. The gap 1015 may be formed due to a failure in generating perfect close adhesion force in a process or due to a problem with an adhesive.

The problem may arise in the edges of the cells 1010 of the microlens array 1000 in addition to the boundary between the cells 1010.

For example, due to the gap 1015, a light leakage phenomenon may occur, and a phenomenon in which light cannot uniformly reach an object with a calculated light amount may also occur. When light travels straight through the gap 1015 and reaches an object, safety-related problems may arise, and, in particular, an eye-safety problem may arise.

In order to solve the problems, according to an embodiment, an auxiliary lens 1017 may be used in the gap 1015 of a boundary surface or an edge. The auxiliary lens 1017 may be a group of at least one lens or a group of parts of lenses. The curvature, aspheric coefficient, size, shape, arrangement, etc. of the auxiliary lens may be differently configured as necessary, but any lens, which achieves a purpose of adding the gap 1015 between boundary surfaces, may be used without limitation.

Even when the surface of each of the cells 1010 has a curved shape such as a circle, the gap 1015 may be formed at a boundary surface. This may also be called a non-filling shape, and an additional coverage may be formed on a boundary through the auxiliary lens 1017.

FIG. 13 is a view describing a light leakage phenomenon of a microlens array.

Referring to FIG. 13, a microlens array 1100 may include a lens part 1110 and a peripheral part 1120.

According to an embodiment, in a distance measurement device using multiple light sources, the microlens array 1100 may be divided into multiple regions.

The lens part 1110 may include a set of microlenses or cells described with respect to FIGS. 2 to 12.

The peripheral part 1120 is a region, other than the lens part, divided according to a design of a light diffusion device or a chip. This may be an actually divided region, or may be an imaginary region based on consideration of arrangement density, position, etc. of microlenses.

According to an embodiment, the peripheral part 1120 may be an extra space in which an indium tin oxide (ITO) pattern is formed and provided for electrical connection. For example, a line width interval may be about 200 micrometers.

Light transferred from a light source (not shown) may pass through the light diffusion device, and may be transferred through a first light path 1101 and/or a second light path 1103.

Crosstalk may occur during light transfer, and this may cause an unexpected electrical or optical interaction due to undesired charge-coupling, inductive coupling, resistance-coupling, etc. in a design process.

Figure 14:
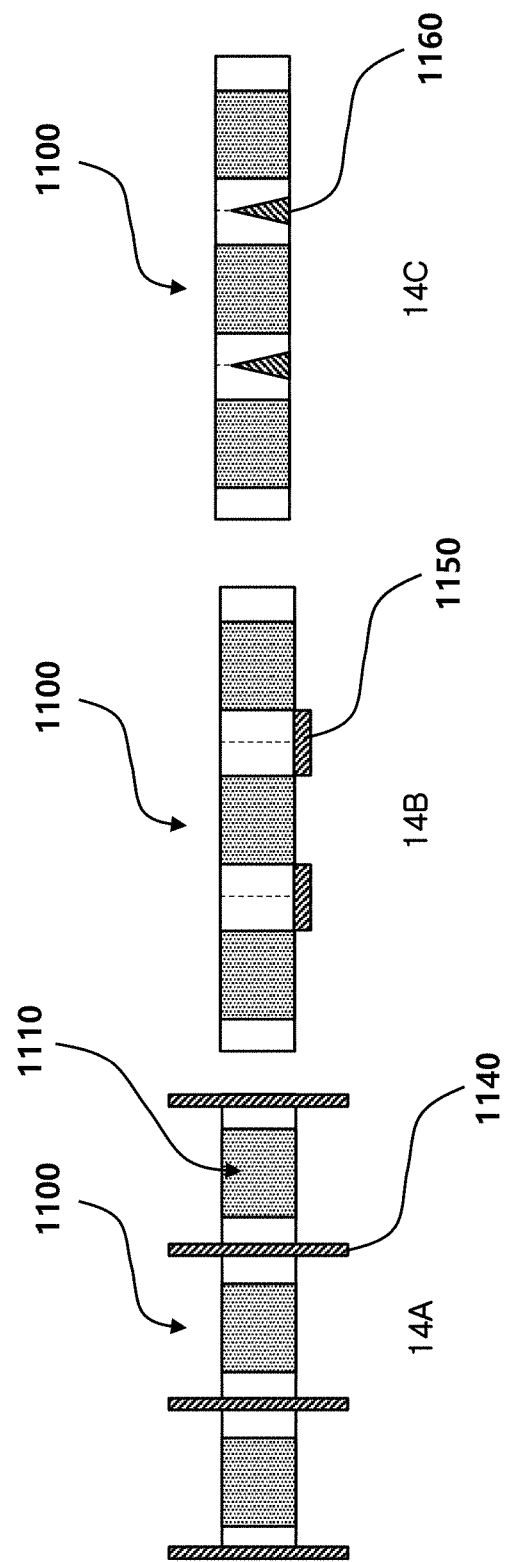
FIG. 14 illustrates a structure of a microlens array for preventing a light leakage phenomenon.

FIG. 14 illustrates a structure of a microlens array for preventing a light leakage phenomenon.

Referring to FIG. 14, a structure of a microlens array for preventing a crosstalk phenomenon or a light leakage phenomenon may be found.

According to an embodiment, various structures 14A, 14B, and 14C for preventing interference of light from at least one light source may be provided.

According to an embodiment, in order to prevent interference of light transferred from at least one light source (not shown), in a structure 14A of a microlens array, blocking walls 1140 may be disposed between cells 1110.

When multiple light sources (not shown) having different radiation angles or outputs are used, the length, thickness, and arrangement of the blocking walls may be adjusted based on a preconfigured reference and based on the radiation angles of the light sources. For example, multiple vertical cavity surface emitting lasers (VCSELs) or light-emitting diodes (LEDs), which have different specifications, may be used as multiple light sources (not shown) having different radiation angles.

According to another embodiment, in order to prevent interference of light transferred from at least one light source (not shown), in a structure 14B of the microlens array, photosensitive materials 1150 may be disposed between the cells 1110.

For example, the photosensitive materials 1150 may be masking tapes, but are not limited thereto.

According to another embodiment, in order to prevent interference of light from at least one light source, in a structure 14C of the microlens array, light-blocking materials 1160 may fill spaces between the cells 1100.

In relation to the light-blocking materials 1160, any material, which can absorb or reflect light but does not allow light to pass, may be used as a filler, and the type thereof is not limited. Before filling of the light-blocking materials 1160, processing of a light diffusion device or a microlens array may be performed. For example, when the light diffusion device is formed of glass, portions of boundary surfaces may be physically or chemically etched, and the insides of the etched regions are filled with the photosensitive materials 1160. An etching depth is a depth of a portion of the light diffusion device, and may be limited in consideration of support force and stability of the light diffusion device.

Figure 15:
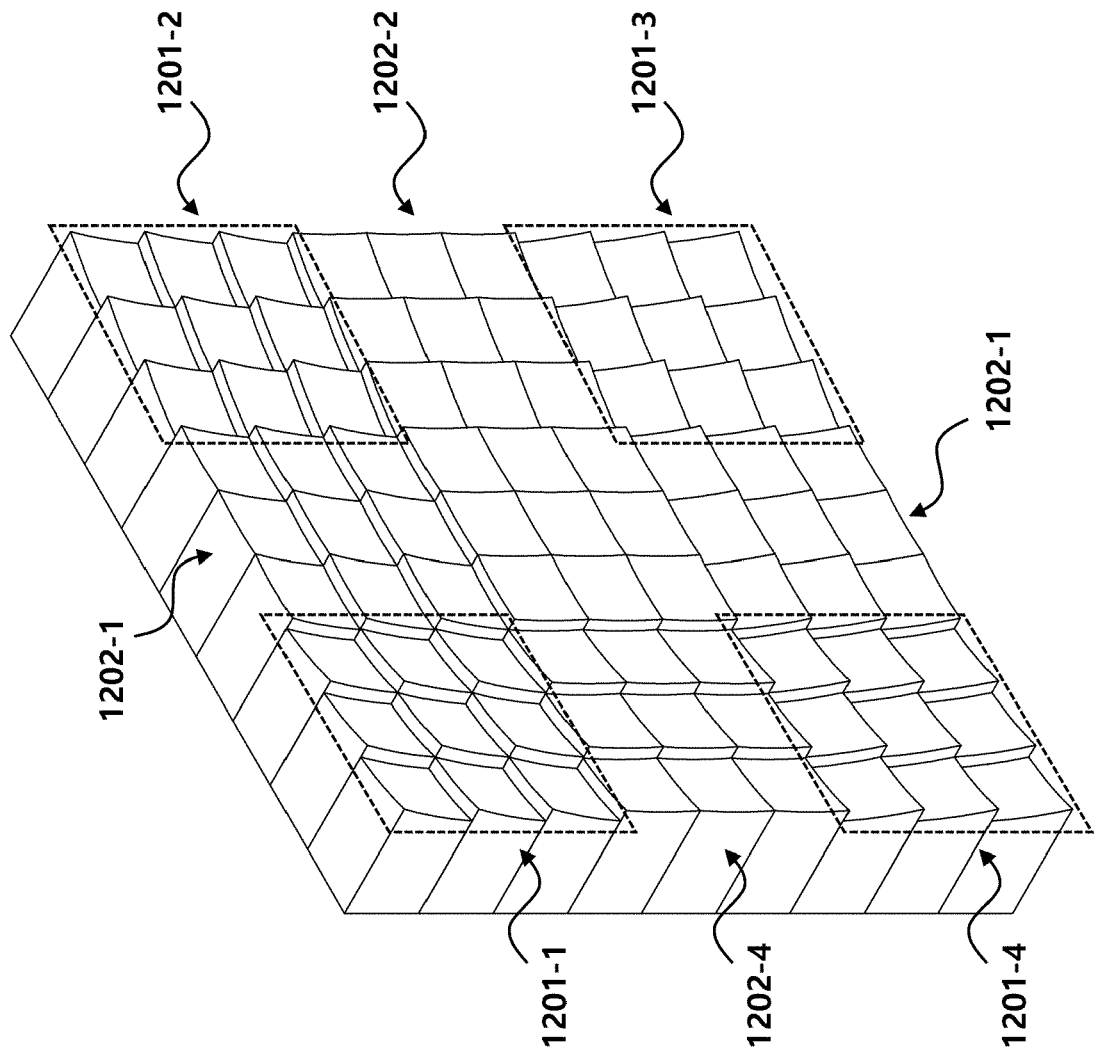
FIG. 15 illustrates a microlens array manufactured through rotation and tilting.

FIG. 15 illustrates a microlens array manufactured through rotation and tilting.

Referring to FIG. 15, a microlens array 1200 may include cells 1201-1, 1201-2, 1201-3, 1201-4, 1202-1, 1202-2, 1202-3, and 1202-4 corresponding to regions into which the microlens array 1200 is divided, and the shape and arrangement of each of the cells may be differently configured as necessary.

In each of the regions of the cells, the above-described tilt profile may be defined such that light transferred from a light source (not shown) can be transferred to a predetermined position on a subject.

The microlens array 1200 may include four cells 1201-1, 1201-2, 1201-3, and 1201-4 formed at corners, four cells 1202-1, 1202-2, 1202-3, and 1202-4 formed at side surfaces, and one cell (not shown) formed at the center portion.

Each of the above-described cells of the microlens array 1200 may be divided into nine regions, which correspond to regions of a light source (not shown) or some of multiple light sources (not shown) so as to allow light to pass.

The four cells 1201-1, 1201-2, 1201-3, and 1201-4 formed at the corners may have the same shape so as to overlap each other through rotation. Further, the four cells 1202-1, 1202-2, 1202-3, and 1202-4 formed at the side surfaces may have the same shape so as to overlap each other through rotation.

Further, each region of the one cell (not shown) formed at the center portion may have a spherical shape which is symmetrical in all directions.

According to an embodiment, the microlens array 1200 may be processed or manufactured to be suitable for the purpose of a distance measurement device having multiple light source chips by adjusting a tilting profile or an angle profile.

A position and an area, which light reaches, may be adjusted based on a tilting profile or an angle profile of the microlens array 1200, and uniform light may reach an object through the microlens array in which random patterns are formed.

A ghost phenomenon may be caused by light passing through one side surface of the microlens array 1200 illustrated in FIG. 15.

The ghost phenomenon may be a phenomenon in which light traveling through a partition wall surface is transferred to a point other than a target. For example, the ghost phenomenon may be caused by total internal reflection by a partition wall or a portion of a microlens.

In order to prevent the above-described ghost phenomenon, the distance measurement device (not shown) may further include a collimator lens. For example, the collimator lens may be installed below the microlens array 1200 so as to prevent a ghost phenomenon caused by a lens surface which is asymmetrical and has high sag. Further, the collimator lens may be used to adjust the distance to or the angle of a light source, thereby increasing luminance efficiency.

The collimator lens may form one system together with the microlens array, or may form a separate system separated therefrom.

The collimator lens may adjust the distance to or the angle of a light source, and a conventionally used collimator lens may be used.

The path of an incident light source may be primarily adjusted by arranging nine collimator lenses at the lower end of the microlens array divided into nine regions, and the angle and shape of a final radiation beam may be secondarily adjusted through the microlens array.

Figure 16:
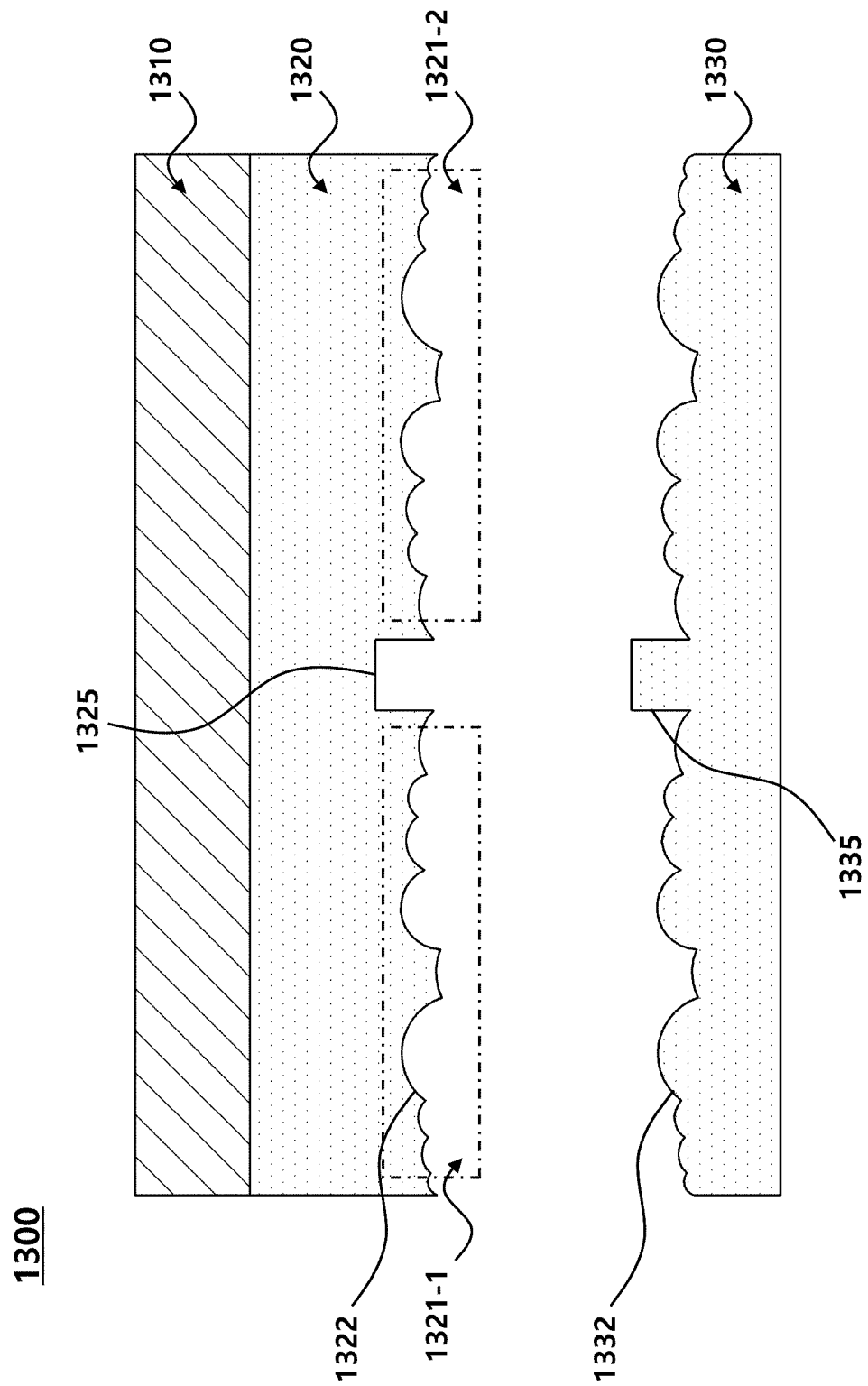
FIG. 16 is a view describing a method for manufacturing a microlens array.

FIG. 16 is a view describing a method for manufacturing a microlens array.

Referring to FIG. 16, a replication device 1300 may include a carrier 1310, a frame 1320, a microlens array 1330, etc.

The carrier 1310 may be connected to an external device (not shown) while being connected to the frame 1320 so as to cause the frame 1320 to move. For example, when the external device (not shown) is a device for generating rotating force of a rotating motor or the like, the frame 1320 connected to the carrier 1310 may rotate.

The frame 1320, which functions as a casting, may be an element for manufacturing a microlens array.

A method for manufacturing the microlens array 1330 may include a step of bringing a polymer melt solution into contact with a surface 1322 of the frame 1320, a step of applying pressure to the surface 1322 of the frame 1320, a step of curing the microlens array 1330, etc. A surface 1322 of the microlens array 1330 manufactured by the above-described method may have the same shape as the surface 1322 of the frame 1320.

A first region 1321-1 and a second region 1321-2 of the frame 1320 may be configured to have shapes which are identical or symmetrical to each other, so that patterns of the microlens array 1330 are identical or symmetrical thereto.

Multiple regions formed in the frame 1320 may have different tilts, and this may be for the purpose of manufacturing the microlens array 1330 having the above-described tilting profile.

The multiple regions formed in the frame 1320 may be formed to have surface shapes identical or symmetrical to each other when being rotated, and this may be for the purpose of manufacturing the microlens array 1330 having the above-described angle profile.

The frame 1320 may have a form in which at least one recess 1325 is formed and coupled to at least one protrusion 1335 of the microlens array 1330. The recess 1325 may play a role of reducing manufacturing process deviations occurring while manufacturing the microlens array 1330. Unlike FIG. 16, the frame 1320 may have a protrusion (not shown) formed thereon, and the microlens array 1330 may have a recess (not shown) formed therein.

One of multiple recesses 1325 of the frame 1320 may be defined as a reference recess, and may be used as an axis about which the frame 1320 rotates. In this case, it is possible to more easily manufacture the microlens array 1330 having the above-described angle profile.

The above-described methods of FIGS. 2 to 15 may be selectively adopted and used in the process of manufacturing the microlens array 1330.

What is claimed is:

1. A microlens array comprising:
an optical substrate configured to define multiple cells having an identical form; and
multiple microlenses distributed on the optical substrate and having angle profiles or tilting profiles,
wherein the multiple cells are rotated in various directions and disposed on the optical substrate,
wherein angle profiles of the multiple cells are defined based on shapes of edges of the cells and correspond to the directions of the multiple cells,
wherein tilting profiles of the multiple cells are defined based on tilts of the microlenses or a tilt of the optical substrate and correspond to light paths of light reaching an object.

2. The microlens array of claim 1, wherein each of the microlenses is defined by a shape profile determining a surface shape of the microlens, a size profile determining a size of the microlens, or a pattern profile determining a pattern of the microlens.

3. The microlens array of claim 2, wherein the angle profiles or the tilting profiles of the multiple cells are configured to give shape to a light beam in response to an intensity profile of light reaching a subject.

4. The microlens array of claim 3, wherein the microlens array is divided into multiple regions corresponding to multiple light sources included in a distance measurement device and an angle profile or a tilting profile is defined for each of the regions.

5. The microlens array of claim 4, further comprising at least one auxiliary lens between the multiple cells.

6. The microlens array of claim 4, further comprising at least one collimator lens.

7. The microlens array of claim 1, further comprising micro-protrusions on a surface of each of the microlenses.

8. The microlens array of claim 1, wherein at least one blocking wall is disposed between the multiple cells.

9. The microlens array of claim 1, wherein at least one photosensitive material is attached between the multiple cells.

10. The microlens array of claim 1, wherein at least one groove is formed between the multiple cells by a glass-process.

11. A method for manufacturing a microlens array having a random disposition pattern, the method comprising:
preparing an optical substrate comprising multiple cells having an identical form;
setting an angle profile based on a shape of an edge of each cell of the multiple cells,
wherein the angle profile of each cell corresponds to a direction of the respective cell, and wherein the multiple cells are rotated in various directions;
setting a tilting profile based on a tilt of a microlens or a tilt of the optical substrate, wherein each tilting profile corresponds to a light path of light reaching an object relative to a respective cell; and
disposing multiple microlenses distributed on the optical substrate based on the angle profile or the tilting profile.

12. The method of claim 11, further comprising forming the multiple microlenses by a polymer hardening.

13. The method of claim 12, wherein the multiple microlenses are formed to have the same shape as that of a frame by hardening.

14. The method of claim 13, wherein the frame comprises at least one reference recess in order to reduce errors in repetitive processes.

15. The method of claim 13, wherein the frame has repetitive predetermined patterns.

16. The method of claim 13, wherein the frame is divided into multiple regions and each of the multiple regions comprises at least one reference recess.

17. The method of claim 13, wherein the frame is divided into multiple regions and the multiple regions respectively have different tilts.

18. The method of claim 13, wherein the frame is divided into multiple regions, each of which always has the same surface shape when it is rotated.

19. The method of claim 18, wherein the optical substrate is divided into multiple regions corresponding to those of the frame and at least one blocking wall is disposed between the multiple regions.

20. The method of claim 18, wherein the optical substrate is divided into multiple regions corresponding to those of the frame and microlenses of a minute size are additionally disposed between the multiple regions.

\* \* \* \* \*